(12) United States Patent
Goldfuss, Jr. et al.

(10) Patent No.: US 7,113,960 B2
(45) Date of Patent: Sep. 26, 2006

(54) SEARCH ON AND SEARCH FOR FUNCTIONS IN APPLICATIONS WITH VARYING DATA TYPES

(75) Inventors: John A. Goldfuss, Jr., Port Crane, NY (US); Michael R. May, Johnson City, NY (US); Larisa M. Rozins, Kalamazoo, MI (US)

(73) Assignee: International Business Machines Corporation, Armonk, NY (US)

(*) Notice: Subject to any disclaimer, the term of this patent is extended or adjusted under 35 U.S.C. 154(b) by 489 days.

(21) Appl. No.: 10/226,857

(22) Filed: Aug. 22, 2002

(65) Prior Publication Data
US 2004/0039752 A1 Feb. 26, 2004

(51) Int. Cl.
*G06F 17/30* (2006.01)
*G06F 15/177* (2006.01)

(52) U.S. Cl. ............... 707/104.1; 707/103 R; 709/223

(58) Field of Classification Search ............ 704/2, 704/3, 4, 8; 707/2, 4, 104.1, 3, 102; 715/536
See application file for complete search history.

(56) References Cited

U.S. PATENT DOCUMENTS

| | | | |
|---|---|---|---|
| 5,640,575 A | 6/1997 | Maruyama et al. ............ | 704/4 |
| 5,737,592 A * | 4/1998 | Nguyen et al. ................ | 707/4 |
| 5,778,356 A * | 7/1998 | Heiny ............................ | 707/2 |
| 5,895,446 A | 4/1999 | Takeda et al. ................ | 704/2 |
| 5,913,210 A | 6/1999 | Call .............................. | 707/4 |
| 6,119,078 A * | 9/2000 | Kobayakawa et al. ......... | 704/3 |
| 6,169,992 B1 * | 1/2001 | Beall et al. ............. | 707/103 R |
| 6,208,956 B1 * | 3/2001 | Motoyama ..................... | 704/2 |
| 6,256,623 B1 | 7/2001 | Jones ............................ | 707/3 |
| 6,321,231 B1 | 11/2001 | Jebens et al. ........... | 707/104.1 |
| 6,526,426 B1 * | 2/2003 | Lakritz ....................... | 715/536 |
| 6,647,364 B1 * | 11/2003 | Yumura et al. ................ | 704/4 |
| 6,754,668 B1 * | 6/2004 | Noble et al. ................ | 707/102 |

(Continued)

FOREIGN PATENT DOCUMENTS

GB 2340001 A 2/2000

(Continued)

OTHER PUBLICATIONS

Gary Perlman (2000) "The FirstSearch User Interface Architecture: Universal Access for any User, in many Languages, on any Platform", ACM pp. 1-8.

(Continued)

*Primary Examiner*—Jeffrey Gaffin
*Assistant Examiner*—Hassan Mahmoudi
(74) *Attorney, Agent, or Firm*—Scully, Scott, Murphy & Presser, P.C.

(57) ABSTRACT

A method and system for conducting a web search. The method comprises the steps of receiving a language selection and a web page selection from a user; and translating said web page into said language, including translating a pull-down list of searchable fields, and for each said field, translating items on one or more selection lists, wherein a code is associated with each item. The method comprises the further steps of providing said translated web page to said user, including providing script enabling said user to select one of said searchable fields and one or more of said items; receiving the codes associated with the selected items, and performing a search in response thereto; and translating results from said search into said language, and providing the translated results to the user. Preferably, the translating step includes the step of converting the data structure of a date or an amount into the selected language.

5 Claims, 3 Drawing Sheets

U.S. PATENT DOCUMENTS

| | | | |
|---|---|---|---|
| 2001/0021934 A1 | 9/2001 | Yokoi | 707/5 |
| 2001/0029455 A1 | 10/2001 | Chin et al. | 704/2 |
| 2002/0123879 A1* | 9/2002 | Spector | 704/2 |
| 2003/0018468 A1* | 1/2003 | Johnson et al. | 704/8 |
| 2004/0006560 A1* | 1/2004 | Chan et al. | 707/3 |

FOREIGN PATENT DOCUMENTS

| | | |
|---|---|---|
| JP | 10187752 A | 7/1998 |
| JP | 11265399 A | 9/1999 |
| WO | WO 99/15989 | 4/1999 |

OTHER PUBLICATIONS

International Business Machines Corporation (1999) "Browser Translator With Dictionary", Research Disclosure, p. 568-569.

Andrew Large et al. (2000) "Multilingual Access to Web Resources: an overview", Program vol. 34, No. 1, pp. 43-58.

Raphael A. Finkel, et al. "The SUDA Project: Collaborative Web-Based Trasnlation", IEEE.

Vinod Anupam, et al. (1998) "Secure Web Scripting", Mobile Code Security, IEEE Internet, pp. 46-55; and.

M. Vlachos, et al. (2000) "Effective Ways for Querying Images by Content Over The Internet", 10th Mediterranean Electrotechnical Conference, MeleCon, IEEE, vol. 1, pp. 337-340.

* cited by examiner

SEARCH ON AND SEARCH FOR FUNCTIONS IN APPLICATIONS WITH VARYING DATA TYPES

BACKGROUND OF THE INVENTION

1. Field of the Invention

This invention generally relates to methods and systems for searching computer applications. More specifically, the invention relates to methods and systems for searching computer applications having varying data types.

2. Background Art

Many computer applications are provided with searching functions that may be used to search through the applications or data bases associated with the applications for specific words, phrases or data values. Generally, these search procedures are straightforward. A user identifies a field to be searched and then identifies a value, such as a word, phrase or numeric value, to be searched for in the identified field. The search function then searches the designated field for the designated word, phrase or numeric value.

Search procedures can be much more complicated if the application or data base being searched has words in more than one language or numeric values in more than one format. For example, a simple search for Mar. 7, 2002, using a standard American format of 3/7/02, would not identify any occurrences of 7/3/02, which is a standard European way to record Mar. 7, 2002. Similarly, a search for the number "192,383.33" may not identify the number "192.383,33," which is a standard European format for the same value.

A specific case in point involves the WOI application, which is an Internet accessible tool developed and hosted by International Business Machines, Corp. (IBM). The WOI application allows suppliers of the IBM corporation and its subsidiaries to process purchase orders, purchase order changes, invoice, invoice rejects and remittance advice documents. These documents contain four types of data that a supplier would want to search on. The types of data are: Character Strings, NLS (National Language Strings) Character Strings, Dates and Amounts. Auditing the search for value entered by the user of the application for each data type is complicated because of the multi-language requirement of the WOI application.

This multi-language requirement affects not only strings of characters but also affects date formats (MM/D/CCYY vs. DD-MM-CCYY, etc.) and amount formats (192,383.33 vs. 192.383,33). The NLS character string problem has to do with coded values that are fields in the documents. A supplier may not know some of these values and thus may not be able to search for certain types, classes or sub-classes of documents. In addition, if a person were working in Spanish on the WOI application, various portions of the application would appear in their Spanish translation.

SUMMARY OF THE INVENTION

An object of the present invention is to improve procedures for searching databases having varying data types.

Another object of this invention is to help search through databases that include multiple languages and multiple data formats.

These and other objectives are attained with a method and system for conducting a web search. The method comprises the steps of receiving a language selection and a web page selection from a user; and translating said web page into said language, including translating a pull-down list of searchable fields, and for each said field, translating items on one or more selection lists, wherein a code is associated with each item. The method comprises the further steps of providing the translated web page to the user, including providing script enabling the user to select one of the searchable fields and one or more of said items; receiving the codes associated with said selected items, and performing a search in response thereto; and translating results from the search into the language, and providing the translated results to the user. Preferably, the translating step includes the step of converting the data structure of a date or an amount into the selected language.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
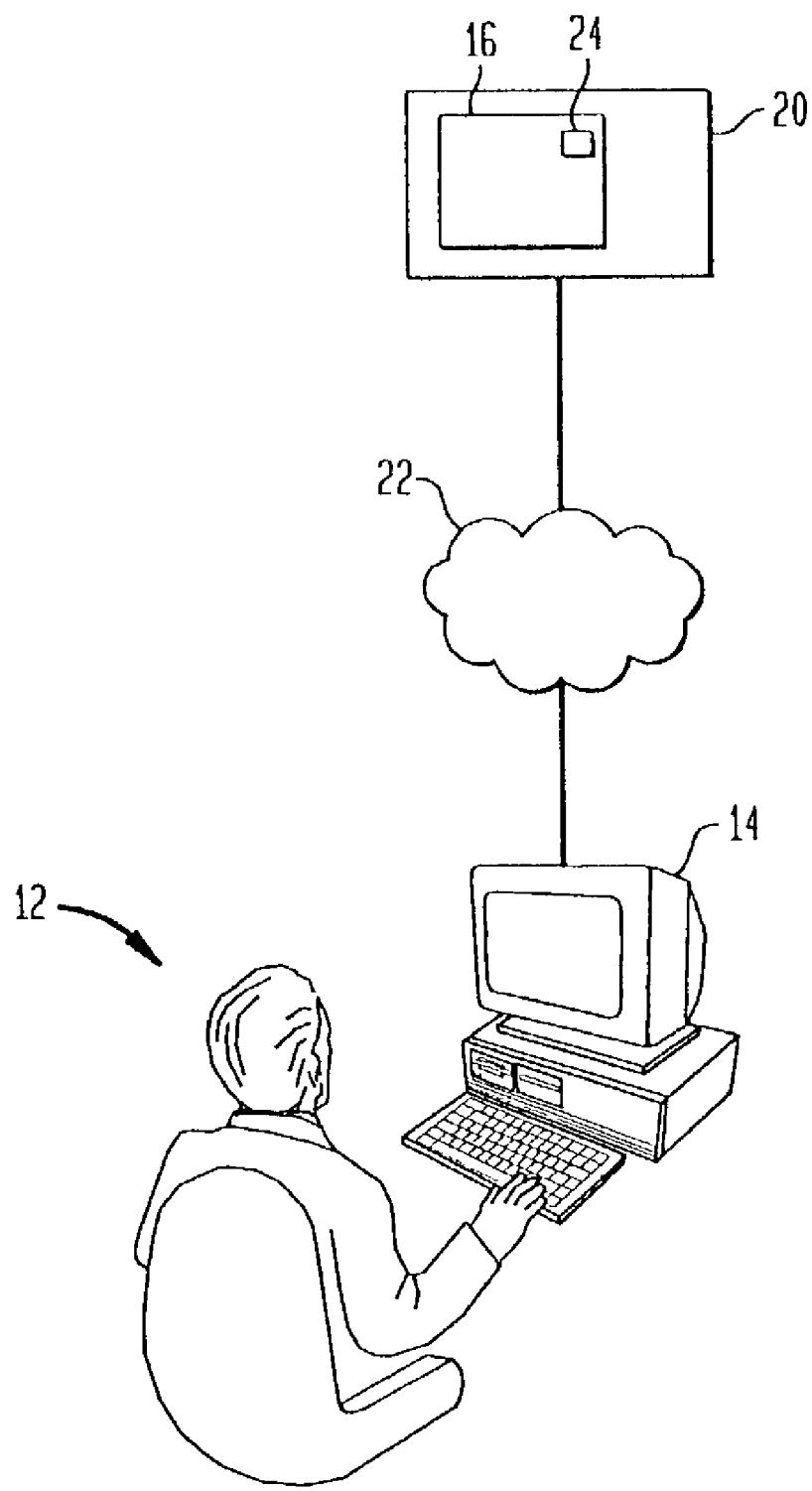
FIG. 1 illustrates an Internet environment in which the present invention may be used.

The present invention, generally, relates to searching through computer applications or databases, and the invention, more particularly, may be used by individuals who are searching such applications or databases via the Internet. FIG. 1 shows an Internet environment in which this invention may be implemented. More specifically, FIG. 1 shows a user 12 having a personal computer 14 for accessing an application 16, running on server 20, via the Internet 22. Application 16 may enable a multitude of functions and include a multitude of files, directories and databases, represented at 24. Computer 14, it may be noted, may be a standard personal computer, including a central processing unit, a monitor, a keyboard, and a mouse or other pointing device.

Application 16 includes multiple languages and multiple data formats; and, as mentioned above, this presents challenges when searching through the application. For example, dates may be stored in either a MM/DD/YY format, or in a DD/MM/YY format, which makes it difficult for a user to identify all references to a specific date. Similar problems may be encountered with other data types.

Figure 2:
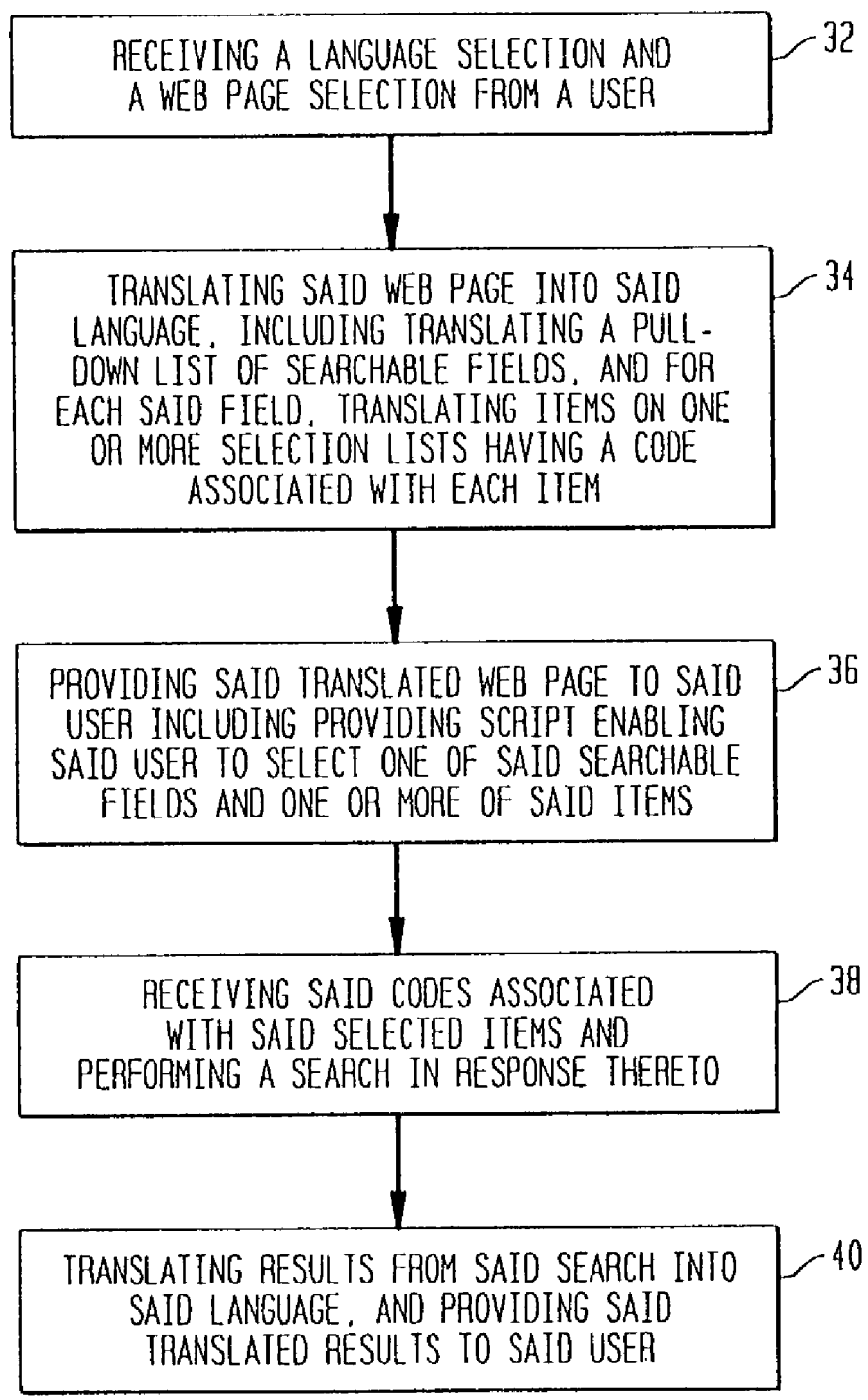
FIG. 2 is a flow chart showing a preferred procedure for carrying out this invention.

FIG. 2 outlines a preferred method to address these challenges in accordance with the present invention. When, as represented at step 32, a language selection and a web page selection are received from a user, the web page, at step 34, is translated into the selected language, including translating a pull-down list of searchable fields. For each of these fields, items are translated on one or more selection lists having a code associated with each item.

At step 36, the translated web page is provided to the user, and script is provided that enables the user to select one of the searchable fields having one or more of the items. At step 38, codes associated with the selected items are received, and a search is performed in response thereto. At step 40, results from the search are translated into the selected language, and the translated results are provided to the user.

The preferred embodiment of the invention includes several innovations in the Search On field and Search For field behavior of the WOI application. Each of these is discussed below.

Search on Field Behavior

Figure 3:
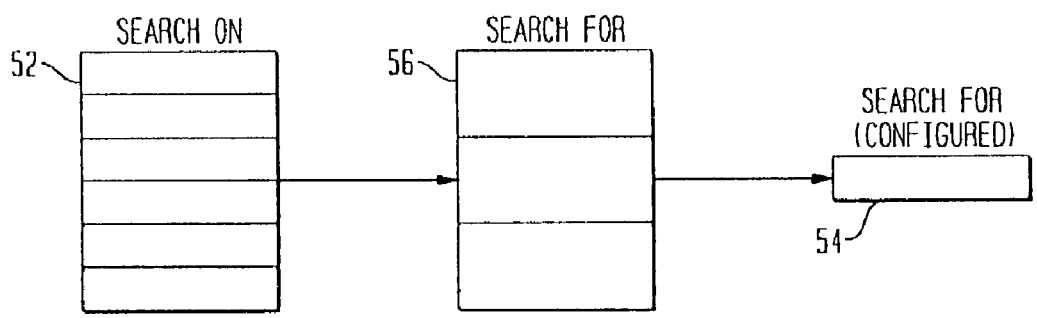
FIGS. 3–6 diagrammatically illustrates several preferred features of the invention.

With reference to FIG. 3, in the preferred embodiment, the supplier is provided with a pulldown list 52 of those fields within each document (P0, P0 change, Invoice, Invoice reject, Remittance advice) that can be searched. The application knows the data type of the field that is selected, and the application dynamically configures, as represented at 54, the search for input fields 56 based on the data type of the search on field selected. This may be done using java script imbedded in the HTML rendered to the browser, and no trips to the web server are required to dynamically configure the search for input fields.

Search for Field Behavior—Character String

Figure 4:
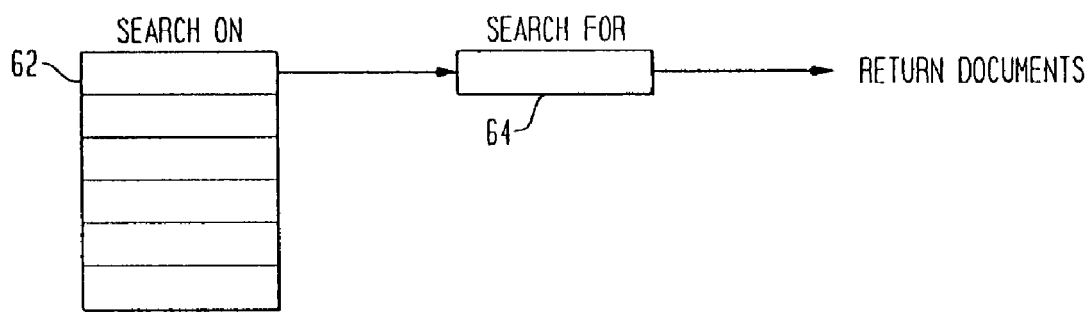

With reference to FIG. 4, when the search on 62 field selected is determined to be a character string, the java script dynamically provides a single search for input field 64. The user enters the string to be searched for using an implied equals operator. The user then initiates a search, for example by pressing a go button next to the search for field, and the application returns those documents that meet the search for value criteria. The user can also enter wildcard values in the string that will allow the application to return a subclass of documents, such as all POs that begin with "46." This is accomplished when the user enters "46*" in the search for value.

Search for Field Behavior—NLS String

Figure 5:
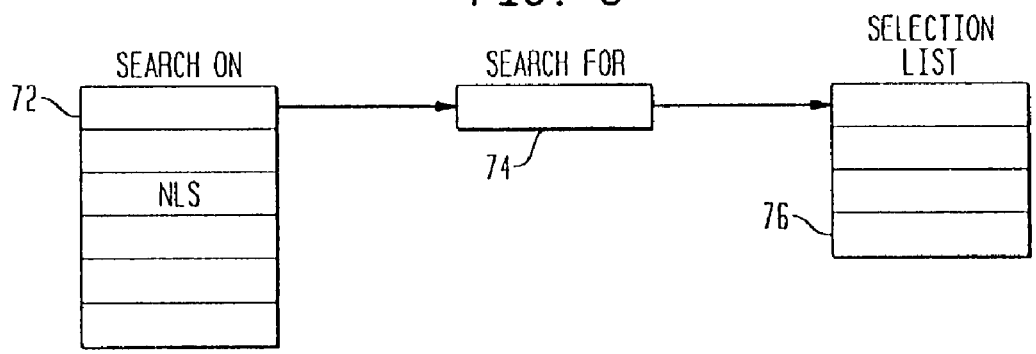

As schematically represented in FIG. 5, when the search on 72 field selected is determined to be an NLS enabled character string, the java script dynamically provides a single search for input field 74 with an accompanying selection list 76. The selectable values in the list appear in the language in which the user is currently using the WOI application, and the user selects the translated value. The WOI application has rendered the database coded equivalents to the HTML at the time the form was rendered to the browser.

The query to find the desired documents in the supporting WOI database is done with the codes associated to the translated string on the screen. An example of this would be that the user wants to see all invoices in "draft" status. To do this, the user selects the status option in the search on field. The application then displays all of the possible status values in the current language of the user ("draft," "submitted," "arrived"). The user selects "draft" (code value in database of DRFT). The user then presses the go button, and all of the invoices in DRFT status are returned for viewing by the user. Preferably, the DRFT code in the database is always the same no matter what the language of the user.

Search for Field Behavior—Date

Figure 6:
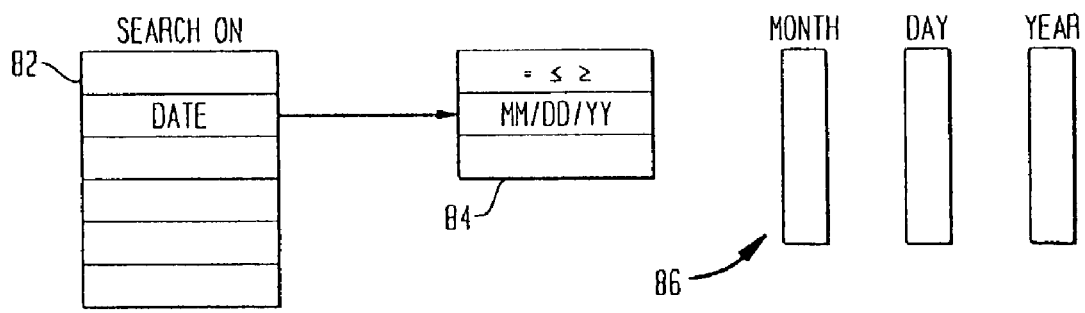

As represented in FIG. 6, when the search on 82 field selected is determined to be a date, the java script dynamically provides multiple search for input fields 84. The first field is an operator field that allows the user to select values of equal, less than or equal, or greater than or equal. These strings are translated to the language of the user. The second field is a set of year, month and day subfields. These subfields are displayed in the order generally accepted for the language that the user is currently using.

For instance, MM/DD/CCYY may be displayed for a U.S. user, or DD-MM-CCYY may be displayed for a French user. All three fields are selectable from a pulldown list, as represented at 86. The values in the pulldown list prevent a user from entering an invalid date. For instance, with the preferred embodiment, it would be impossible for the user to specify a value of February 30. Because date formats vary around the world. Also, preferably, the months file is a translated version of the acceptable abbreviations for the current language of the user. In this way, the user does not get confused about which field is the days field versus the month field.

Search For Field Behavior—Amount

When the search on field selected is determined to be an amount, the java script dynamically provides multiple search for input fields. The first field is an operator field that allows the user to select values of equal, less than or equal, or greater than or equal. These strings are translated to the language of the user. The second field is provided for the user to enter the amount.

The preferred embodiment of the invention, as described above, provides a number of important advantages. For example, the invention may substantially reduce any possible confusion by the user. In particular, the user cannot enter an invalid date. Also, when an NLS string is selected, the user does not have to worry about typing the string incorrectly. In addition, the user does not have to take into consideration what language he/she is currently using.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A web search method, comprising the steps of:
   a user at a client computer accessing an application running on a server via the Internet, said application including databases in multiple languages and multiple data formats;
   the user at the client computer selecting a language and a web page;
   transmitting said language selection and said web page selection from said user client computer to the server computer;
   translating said web page into said language;
   providing said translated web page to said user, including the server computer providing a script to the client computer, a plurality of selection lists, and a list of codes associated with each of said selection lists;
   presenting to the user, at the client computer, a list of search on fields, each of the search on fields having a given data type;
   the user, at the client computer, selecting each of the search on fields;
   when each of the search on fields is selected, said script dynamically configuring a search for input for the selected search on field and based on the data type of the selected search on field, including the steps of;
   at first times, said script providing a single search for character string input field; and the user entering a character string in said single search for input field, and initiating a search for documents that meet a search for value criteria;
   at second times, said script providing a single search for input field with an accompanying selection list of values, said values appearing in the language selection of the user, and each of said values being associated with a code, wherein the code associated with each value is the same regardless of the language in which the value appears; and the user selects one of the values on the selection list, and initiates a search for documents having said selected value, said server receiving from the client computer the code associated with the selected value and conducting a query using said received code to find documents in one of the databases;

at third times, said script providing multiple search for data input fields, a first of said data input fields being an operator field; and a second of said data input fields including a set of year, month and date subfields, said subfields being displayed in different orders depending on the user language selection; said script further providing a pulldown list having values for each of said subfields; and at fourth times, said script providing a plurality of search for amount input fields, a first of said amount input fields being an operator field, and a second of said amount input fields being a monetary amount field, said monetary amount field being arranged in different ways depending on the user language selection; and providing results of the searches to the user at the client computer in the language selection of the user.

2. A method according to claim 1, further comprising the steps of:

providing a software tool to assist in the search;
providing the user with a list of a group of fields, each of said fields including data in an associated data format;
the user selecting one of the fields in the list, and inputting a value to be searched for in the selected field; and
the software tool configuring the input value in the data format associated with the selected field.

3. A method according to claim 1, wherein:

said databases include purchase orders, purchase order changes, invoices, invoice rejects, and remittance advice documents;
the list of search on fields consists of purchase orders, purchase order changes, invoices, invoice rejects, and remittance advice documents;
said script is embedded in HTML rendered to the client computer; and
the selection list of values includes all of a group of document status values describing the status of documents in the database, said document status values being displayed in the language selection of the user.

4. A program storage device readable by a machine, tangibly embodying a program of instructions executable by the machine to perform method steps for conducting a web search, said method steps comprising:

enabling a user at a client computer accessing an application running on a server via the Internet, said application including databases in multiple languages and multiple data formats;
enabling the user at the client computer to select a language and a web page;
transmitting said language selection and said web page selection from said user client computer to the server computer;
translating said web page into said language;
providing said translated web page to said user including the server computer providing a script to the client computer, a plurality of selection lists, and a list of codes associated with each of said selection lists;
presenting to the user, at the client computer, a list of search on fields, each of the search on fields having a given data type;
the user, at the client computer, selecting each of the search on fields;
when each of the search on fields is selected, said script dynamically configuring a search for input for the selected search on field and based on the data type of the selected search on field, including the steps of:
at first times, said script providing a single search for character string input field; and the user entering a character string in said single search for input field, and initiating a search for documents that meet a search for value criteria;
at second times, said script providing a single search for input field with an accompanying selection list of values, said values appearing in the language selection of the user, and each of said values being associated with a code, wherein the code associated with each value is the same regardless of the language in which the value appears; and the user selects one of the values on the selection list, and initiates a search for documents having said selected value, said server receiving from the client computer the code associated with the selected value and conducting a query using said received code to find documents in one of the databases;
at third times, said script providing multiple search for data input fields, a first of said data input fields being an operator field; and a second of said data input fields including a set of year, month and date subfields, said subfields being displayed in different orders depending on the user language selection; said script further providing a pulldown list having values for each of said subfields; and
at fourth times, said script providing a plurality of search for amount input fields, a first of said amount input fields being an operator field, and a second of said amount input fields being a monetary amount field, said monetary amount field being arranged in different ways depending on the user language selection; and
providing results of the searches to the user at the client computer in the language selection of the user.

5. A program storage device according to claim 4, wherein said method steps further comprise the steps of:

providing a software tool to assist in the search;
providing the user with a list of a group of fields, each of said fields including data in an associated data format;
the user selecting one of the fields in the list, and inputting a value to be searched for in the selected field; and
the software tool configuring the input value in the data format associated with the selected field.

* * * * *